Dec. 27, 1960

L. A. SADER 2,966,001

SAFETY DEVICE

Filed March 5, 1958

INVENTOR
LOUIS A. SADER

BY
Barnes, Kisselle, Raisch & Choate

ATTORNEYS

United States Patent Office 2,966,001
Patented Dec. 27, 1960

2,966,001

SAFETY DEVICE

Louis A. Sader, 1434 Wayburn, Grosse Pointe Park, Mich., assignor of one-half to John J. Digiovanni, Grosse Pointe Woods, Mich.

Filed Mar. 5, 1958, Ser. No. 719,322

4 Claims. (Cl. 43—44.95)

This invention relates to a safety device for fish hooks and more particularly to a device on which fish hooks can be engaged to prevent the hooks from snagging clothing or flesh while carrying the fish hooks or from becoming entangled with other fishing equipment in a tackle box.

It is an object of this invention to provide a safety device of the type described which is of simple construction and which is economical to manufacture.

A further object of the invention comprises the provision of a safety device of the type described which can be also used for attaching a snelled hook to a fishing line.

Figure 2:
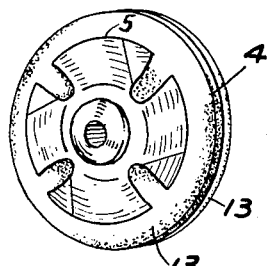
Fig. 2 is a perspective view of the safety device.

The safety device of the present invention generally comprises two colored plastic discs 13 which are held together in assembled relation by a center rivet 6. The discs are yieldably pressed together by means of a spring 5 in the form of a star wheel. Each disc is formed on the inner face thereof with an annular groove 15 around the outer periphery thereof. The groove 15 is of arcuate cross section as illustrated. Around the outer periphery of disc 13, the groove 15 defines a lip 16 and the central portion of the inner face of the disc comprises a boss 17 which extends axially beyond the lip 16.

Figure 4:
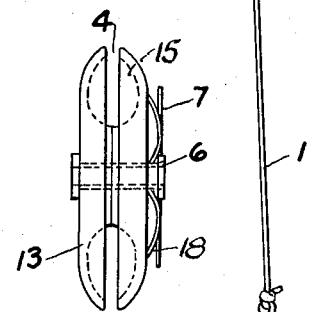
Fig. 4 is an end view of the safety device.
Figure 5:
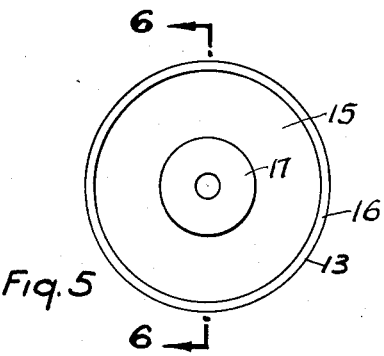
Fig. 5 is a side elevational view of one of the plastic discs comprising the device as viewed from the inner face thereof.
Figure 6:
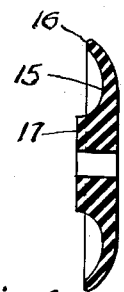
Fig. 6 is a sectional view along the line 6—6 in Fig. 5.
Figures 7, 8:
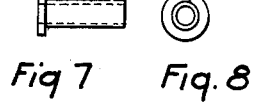
Fig. 7 is a side elevational view of the center rivet for holding the elements of the device in assembled condition.
Fig. 8 is an end view of the rivet shown in Fig. 7.

The spring 5 comprises a plurality of spring fingers 7 having axially inwardly bent end portions 18. When the disc members 13 and the spring 5 are assembled together as shown in Fig. 4 by means of the central tubular rivet 6, the bent end portions 18 of the spring press against the outer surface of the adjacent disc 13 to yieldably urge the two discs together with the faces of the bosses 17 in contacting relation. In this condition, it will be observed that the two peripheral lips 16 are spaced apart to form a slot 4 therebetween.

Figure 10:
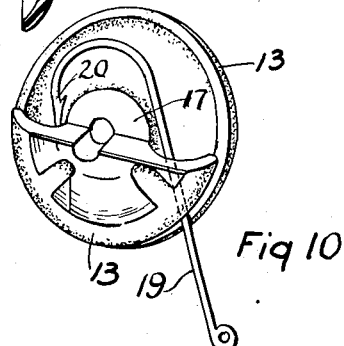
Fig. 10 is a perspective view, partly in section, showing the manner in which a hook is engaged with the safety device.
Figure 9:
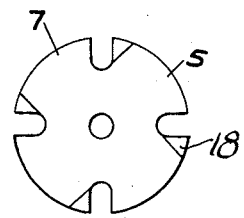
Fig. 9 is a side elevational view of the spring star wheel.

The safety device described is admirably suited for protecting the barbed ends of fish hooks. The manner in which a fish hook is engaged with the safety device is shown in Fig. 10. A fish hook is illustrated in Fig. 10 having a shank 19 and a barbed point 20. As is conventional, the barbed point 20 is cocked at an angle with reference to the axis of shank 19. To engage the fish hook with the safety device, the central portion of the shank is inserted in the slot 4 with the barbed point 20 extending beyond the periphery of the discs 13. The shank 19 is then drawn axially toward the discs 13 so that the barbed point 20 registers with slot 4. The shank is then pulled downwardly so that the barbed point 20 snaps into the grooves 15. This snapping action occurs because of the angular disposition of the barbed point 20 with respect to the shank 19 of the fish hook. The fish hook is thus firmly retained on the safety device with the barbed point 20 and the rounded end portion of the hook snugly engaged within the grooves 15. With the pointed end of the hook thus protected, the hook may be carried freely in the pocket without danger or may be stored in a tackle box without the possibility of entanglement with other fishing equipment.

The device of this invention has a dual function. In addition to its function of protecting the barbed end of a hook, the device is also admirably suited for attaching a snelled hook to a fish line. The device itself can be readily attached to a fish line by merely wrapping a portion of the line as a single loop within the slot 4 and then pulling the two ends of the line so that the looped portion of the line will be pulled inwardly between the two bosses 17 and held in this condition by the tension of spring 5.

Figure 1:
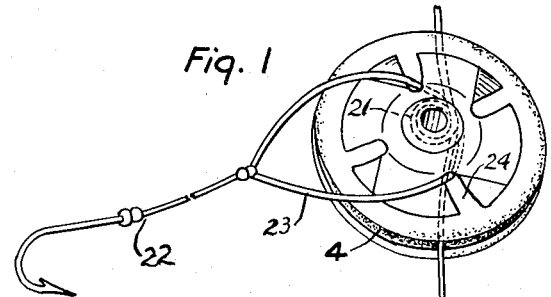
Fig. 1 is a perspective view of the safety device showing the manner in which it is attached to a line and showing a snelled fishing hook attached to the line by means of the safety device.
Figure 3:
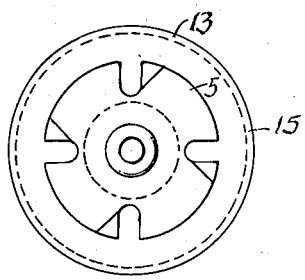
Fig. 3 is a side elevational view of the safety device.

The device is shown attached to a fish line which is provided with a sinker 2 in Fig. 1. The looped portion of the line that is retained between the two bosses 17 is indicated at 21. To attach a snelled hook, generally designated at 22, to the line 1, it is merely necessary to slip the looped portion 23 of the leader beneath the fingers 7 of the spring 5. The fingers 7, it will be observed, are, for the most part, spaced from the outer face of the adjacent disc 13. The loop 23 is drawn outwardly into the slots 24 between fingers 7 and then pulled toward the center of the discs so as to snap past the bent end portions 18 of the fingers. The snelled hook is thus effectively attached to the safety device and the safety device is in turn effectively attached to the fish line.

Thus, it will be seen that I have provided a safety device which can be used in a very simple manner to positively protect the barbed ends of fish hooks. The safety device is at the same time designed so that it can provide a means for attaching snelled hooks to a fish line without the need of tying any knots.

This application is a continuation-in-part of my copending application Serial No. 647,555, filed March 21, 1957, and now abandoned.

I claim:

1. A device adapted to be releasably and frictionally attached to a fish line and at the same time adapted to have a fish hook locked therein to enclose the pointed end of the hook comprising a pair of discs, means extending centrally through the discs and mounting them in face-to-face relation, resilient means acting between at least one of the discs and said mounting means and biasing said discs toward one another, said resilient means and said mounting means permitting yieldable bodily movement of the discs axially toward and away from one another, said discs having opposed central pads on their inner surfaces normally held in contacting face-to-face relation by said biasing means, said pads having a diameter substantially greater than the diameter of said mounting means and extending continuously across the entire central area portion of the discs except for the center through which the mounting means extend, whereby a line may be passed between the contacting pads and frictionally held therebetween by the tension of said resilient means, said discs on their inner faces each having a groove therein surrounding the central pad and extending radially from the periphery of the central pad to adjacent the outer periphery of the discs, said grooves being axially opposed to form an annular recess between the inner faces of the discs around the contacting central pads, said annular recess communicating directly with the space between said central pads when the two discs are bodily moved away from one another against the tension of said resilient means, said annular recess being sufficiently large to receive the bight portion of the hook to be used therewith, the outer peripheral edges of the discs being spaced apart only slightly in an axial direction to form a narrow annular access opening into the annular recess formed by the grooves to permit insertion of the bight end of a hook into the recess with the shank of the hook extending outwardly through said narrow access opening and the bight portion of the hook seated in the annular recess.

2. A device as called for in claim 1 wherein the central pad portion of each disc has a diameter less than the perpendicular distance between the pointed end and the shank of the hook to be used therewith whereby the hooked end of the fish hook may be inserted in said recess so as to extend generally around said central contacting pad portions of the discs.

3. A device as called for in claim 1 wherein said grooves are of arcuate shape in radial cross section.

4. A device as called for in claim 1 wherein said mounting means comprises a fastening element extending axially through said central pad portions of the two discs.

References Cited in the file of this patent

UNITED STATES PATENTS

| | | |
|---|---|---|
| 484,661 | King | Oct. 18, 1892 |
| 2,029,975 | Winchester | Feb. 4, 1936 |
| 2,422,870 | Willis | June 24, 1947 |
| 2,553,097 | Lampe | May 15, 1951 |

FOREIGN PATENTS

| | | |
|---|---|---|
| 16,185 | Great Britain | 1891 |
| 634,009 | Great Britain | 1950 |